United States Patent [19]

Hagen et al.

[11] 3,876,621

[45] Apr. 8, 1975

[54] PROCESS FOR PRODUCING O-CYANO-PHENYL AND O-CYANO-BENZOISOTHIAZOLYL AZO-P-AMINOBENZENE DYES

[75] Inventors: Helmut Hagen, Frankenthal; Guenter Hansen; Ernst Schaffner, both of Ludwigshafen, all of Germany

[73] Assignee: Badische Anilin- & Soda-Fabrik Aktiengesellschaft, Ludwigshafen, Rhine, Germany

[22] Filed: June 30, 1972

[21] Appl. No.: 267,970

[30] Foreign Application Priority Data

July 13, 1971 Germany.............................. 2134896

[52] U.S. Cl. ............... 260/157; 260/158; 260/205; 260/206; 260/207; 260/207.1; 260/208
[51] Int. Cl. ........................................... C09b 43/00
[58] Field of Search.......... 260/208, 465 R, 205, 157

[56] References Cited
UNITED STATES PATENTS

| | | | |
|---|---|---|---|
| 2,195,076 | 3/1940 | Braun et al. | 260/465 R |
| 2,570,024 | 10/1951 | Charpentier | 260/465 R |
| 3,452,076 | 6/1969 | Mohr et al. | 260/465 R |
| 3,549,635 | 12/1970 | Ott | 260/465 R |

FOREIGN PATENTS OR APPLICATIONS

| | | | |
|---|---|---|---|
| 327,049 | 7/1914 | Germany | 260/465 |
| 484,992 | 3/1970 | Switzerland | 260/208 |

OTHER PUBLICATIONS

Migrdichian, "The Chemistry of Organic Cyanogen Compounds," (1947) p. 128, QD181CISMIS.

Gilman et al., "Organic Syntheses," coll. Vol. I, 2nd ed., (1951), pp. 107–109, QD262072.

Primary Examiner—Henry R. Jiles
Assistant Examiner—Robert W. Ramsuer
Attorney, Agent, or Firm—Johnston, Keil, Thompson & Shurtleff

[57] ABSTRACT

A process for the production of o-cyano-phenyl and o-cyano-benzoisothiazolyl, azo-p-aminobenzene dyes by replacing a bromine atom in the ortho-position by the cyano group through reaction with a heavy metal cyanide, particularly cuprous cyanide, in an aqueous medium and at elevated temperature.

2 Claims, No Drawings

PROCESS FOR PRODUCING O-CYANO-PHENYL AND O-CYANO-BENZOISOTHIAZOLYL AZO-P-AMINOBENZENE DYES

The invention relates to a process for the production of azo dyes containing cyano groups from azo dyes devoid of water-solubilizing groups which contain bromine atoms attached to an aryl or heterocyclic radical by reaction with heavy metal cyanides, preferably cuprous cyanide or compounds which form cuprous cyanide, wherein the reaction is carried out in water at elevated temperature.

Aryl radicals and heterocyclic radicals of aromatic nature in accordance with this invention which contain exchangeable halogen atoms are particularly phenyl radicals, and also quasiaromatic heterocycles, as for example benzoisothiazolyl-1,2 or benzoisothiazolyl-2,1 radicals.

It is surprising that this replacement of bromine atoms by cyano groups should take place under the conditions of the process defined because the same dyes containing halogen are completely degraded when treated with alkali metal cyanides alone.

The replacement of halogen by cyano in azo dyes in an organic medium is known from the patent literature, for example German Published Specification No. 1,544,563 and Swiss Patent Specification No. 484,992.

Because of the fact that the dyes to be used for the exchange have little or no solubility in water it is extremely surprising that the replacement of bromine by cyano can be carried out in many cases in aqueous suspension.

The new process is particularly suitable for the production of azo dyes containing cyano groups and having the formula (I):

In this formula A is a substituted phenyl or benzoisothiazolyl radical in which the CN substituent is in the ortho position to the azo group and K is a N-substituted para-aminophenylene radical.

Dyes which correspond to the general formulae (I) and (II):

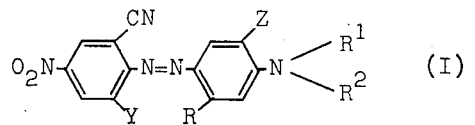

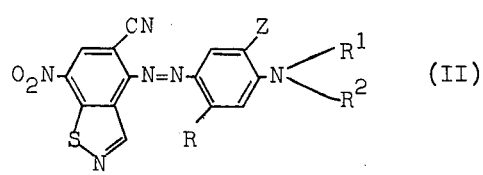

in which
Y is bromine, nitro or a radical of one of the formulae:

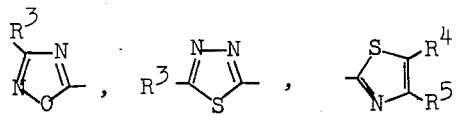

Z is hydrogen, methoxy or ethoxy;
R is hydrogen, methyl, chlorine, methoxy, acetylamino or propionylamino;
$R^1$ is alkyl of one to four carbon atoms, hydroxyethyl, cyanoethyl, benzyl, phenylethyl or γ-acetylaminopropyl;
$R^2$ is alkyl of one to four carbon atoms or hydroxyethyl;
$R^3$ is hydrogen, alkyl of one to four carbon atoms, phenyl, methylphenyl, chlorophenyl, methoxyphenyl or dichlorophenyl;
$R^4$ is methyl;
$R^5$ is carbomethoxy or carboethyoxy; and
$R^4$ and $R^5$ together may be a benzene ring which may bear methyl, ethyl, methoxy or ethoxy as substituents;

may preferably be prepared according to the new process.

The following radicals are examples of suitable radicals other than those already specifically mentioned: for $R^1$: methyl, ethyl, n-propyl, isopropyl, n-butyl or isobutyl; for $R^2$: methyl, ethyl, n-propyl, isopropyl, n-butyl or isobutyl.

Replacing bromine by cyano is particularly successful in the case of dyes which have electron-yielding groups in the coupling components and in which Y is a heterocyclic radical.

Suitable starting materials are compounds which contain a bromine atom instead of the cyano group.

The new process is advantageously carried out by suspending the starting dye in water if necessary with the addition of a wetting agent, adding cuprous cyanide or a compound which forms cuprous cyanide, and heating the whole to about 70° to 180°C. Preferred reaction temperatures are within the range from 110° to 150°C in which case superatmospheric pressure obviously has to be used. Agitated autoclaves are preferred as pressure vessels. The reactants are used in at least a ratio of 1 : 1, but an excess of cuprous cyanide of up to 50 percent is advantageous.

The reaction time is generally from 3 to 6 hours.

Conventional products such as adducts of ethylene oxide to alcohols or phenols may be used as wetting agents.

The following Examples illustrate the invention. In the following Examples parts and percentages are by weight unless otherwise stated.

EXAMPLE 1

27.5 parts of the dye 2,4-dinitro-6-bromoaniline → 3-acetylamino-6-methoxy-N-β-cyanoethyl-N-β-hydroxyethylaniline is stirred in an autoclave with 5.0 parts of cuprous cyanide in 500 parts of water for 3 hours at 120°C. After cooling, the contents of the autoclave are suction filtered and the residue is digested with 83 parts of a 10 percent sodium cyanide solution. The product is washed until the filtrate is neutral and colorless and then dried slightly at 40°C at subatmospheric pressure. A dye is obtained which according to thin layer chromatography no longer contains starting dye and which dyes polyester cloth blue shades.

EXAMPLE 2

15.4 parts of the dye 2,6-dibromo-4-nitroaniline → 3-diethylaminoacetanilide is stirred in an autoclave in 500 parts of water together with 30 parts of cuprous cyanide for 15 hours at 120°C. After the autoclave has been cooled and the produced has been suction filtered, the residue is stirred at room temperature with 400 parts of a 10 percent sodium cyanide solution, suction filtered, washed with water and dried at 50°C at subatmospheric pressure.

A bluish black powder is obtained which according to a thin layer chromatogram no longer contains starting dye and which consists of about 70 to 80 parts of the 2,6-dicyano dye and 20 to 30 parts of the 6-monocyano dye. The reaction product dyes polyester cloth fast reddish blue shades by the HT method.

EXAMPLE 3

24.6 parts of the dye 5-bromo-7-nitro-4-aminobenzoisothiazole-1,2 ⟶ 3-diethylaminoacetanilide is heated with 500 parts of water and 12.5 parts of the cuprous cyanide for 3 hours at 120°C in a rolling autoclave having a capacity of 2 liters. After cooling, the contents of the autoclave are suction filtered, stirred with a mixture of 40 parts of 20 percent ammonia solution and 50 parts of water for 1 hour, again suction filtered, washed until neutral and dried at 50°C at subatmospheric pressure. A blue black powder is obtained which dyes polyester cloth fast blue shades according to the HT method.

EXAMPLE 4

28.1 parts of the dye 5-bromo-7-nitro-4-aminobenzoisothiazol,2 ⟶ 3-acetylamino-6-methoxy-N-β-cyanoethyl-N-β-hydroxyethylaniline is reacted together with 10.0 parts of cuprous cyanide and 500 parts of water for 5 hours in an autoclave at 120°C. After the autoclave has cooled the contents are suction filtered, the filter cake is stirred at room temperature with a mixture of 40 parts of 20 percent ammonia solution and 50 parts of water for 30 minutes, suction filtered, washed with water until neutral and dried at 60°C at subatmospheric pressure. A blackish powder is obtained which dissolves in dimethylformamide with a blue green color and dyes polyester cloth turquoise shades.

When 26.2 parts of the dye 5-bromo-7-nitro-4-aminobenzoisothiazole-1,2 ⟶ 3-acetylamino-N,N-β-dihydroxyethylaniline is used instead of 28.1 parts of the dye 5-bromo-7-nitro-4-aminobenzoisothiazole-1,2 ⟶ 3-acetylamino-6-methoxy-N-β-cyanoethyl-N-β-hydroxyethylaniline and the above procedure is otherwise followed, a dye is obtained which dyes polyester similar shades.

EXAMPLE 5

29.6 parts of the dye 2-bromo-4-nitro-6-[5'-(3'-o-tolyloxidiazolyl-1',2',4')]-1-aminobenzene ⟶ 3-diethylaminoacetanilide is stirred for 3 hours at 120°C with 500 parts of water and 5.2 parts of cuprous cyanide in an autoclave, then cooled, a mixture of 40 parts of concentrated ammonia solution and 50 parts of water is added, the whole is stirred for 1 hour at room temperature, the dye is suction filtered and washed with water until the filtrate runs away colorless. The dye formed is dried at 60°C at subatmospheric pressure. The blue black powder obtained, which dissolves in dimethylformamide with a blue color, dyes polyester cloth very fast reddish blue shades.

EXAMPLE 6

25.8 parts of the dye 2-bromo-4-nitro-6-[5'-(3'-methyloxdiazolyl-1',2',4')]-1-aminobenzene ⟶ 3-diethylaminoacetanilide is stirred in 500 parts of water with 5.2 parts of cuprous cyanide for 3 hours at 115°C. The mixture is worked up according to Example 5 and a dark powder is obtained which dyes polyester fibers reddish blue shades of high fastness to heat setting.

Further dyes are set out in the following Examples; they are obtained analogously by reaction of the 2-bromoazo dyes with cuprous cyanide.

EXAMPLE 7

Starting product: 2-bromo-4-nitro-6-[5'-(3'-isopropyloxdiazolyl-1',2',4')]-aniline ⟶ 3-diethylaminoacetanilide. End product:

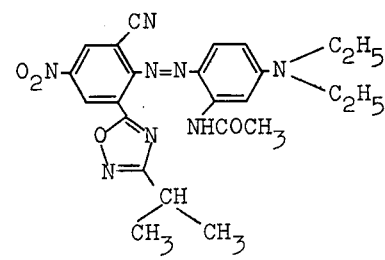

Reaction time: 5 hours. Temperature: 110°C. Shade on polyethylene glycol terephthalate: blue.

EXAMPLE 8

Starting product: 2-bromo-4-nitro-6-[5'-(3'-ethyloxdiazolyl-1',2', 4')]-aniline ⟶ N,N-β-bishydroxyethylamino-3-acetylaminobenzene. End product:

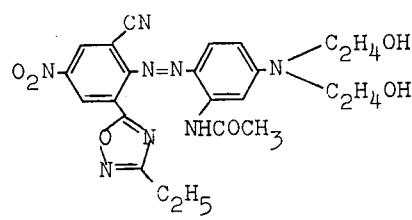

Reaction time: 3 hours. Temperature: 120°C. Shade on polyethylene glycol terephthalate: blue.

EXAMPLE 9

Starting product: 2-bromo-4-nitro6-[5'-(3'-phenyloxdiazolyl-1',2',4')]-aniline ⟶ N-β-hydroxyethyl-N-ethyl-m-toluidine. End product:

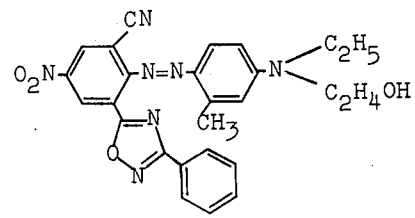

Reaction time: 3 hours. Temperature: 120°C. Shade on polyethylene glycol terephthalate: violet.

EXAMPLE 10

Starting product: 2-bromo-4-nitro-6-[5'-(3'-n-propyloxdiazolyl-1'.2',4')]-aniline⟶N-β-cyanoethyl-N-β-methoxyethyl-m-toluidine. End product:

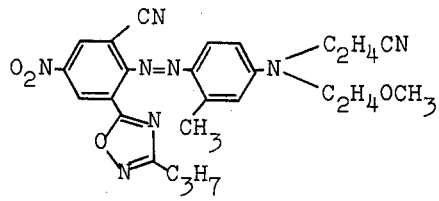

Reaction time: 3 hours. Temperature: 120°C. Shade on polyethylene glycol terephthalate: red violet.

EXAMPLE 11

Starting product: 2-bromo-4-nitro-6-[5'-(3'-n-butyloxdiazolyl-1',2',4')]-aniline⟶N-β-carbomethoxyethyl-N-ethylaniline. End product:

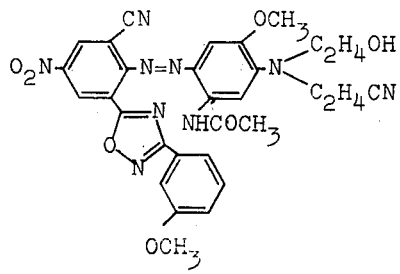

Reaction time: 3 hours. Temperature: 120°C. Shade on polyethylene glycol terephthalate: red violet.

EXAMPLE 12

Starting product: 2-bromo-4-nitro-6-[5'-(3'-m-methoxyphenyl-oxdiazolyl-1',2',4')]-aniline⟶N-β-hydroxyethyl-N-β-cyanoethylamino-3-acetylamino-6-methoxybenzene. End product:

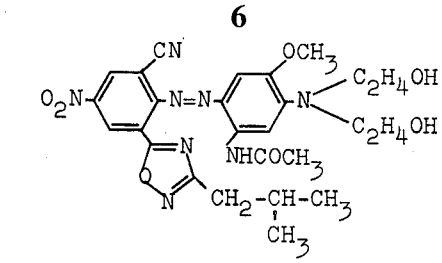

Reaction time: 3 hours. Temperature: 90°C. Shade on polyethylene glycol terephthalate: greenish blue.

EXAMPLE 13

Starting product: 2-bromo-4-nitro-6-[5'-(3'-isobutyloxdiazolyl-1',2',4')]-aniline⟶N,N-β-bishydroxyethylamino-3-acetylamino-6-methoxybenzene. End product:

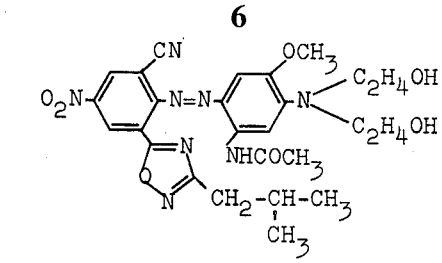

Reaction time: 3 hours. Temperature: 120°C. Shade on polyethylene glycol terephthalate: greenish blue.

EXAMPLE 14

Starting product: 2-bromo-4-nitro-6-[5'-(3'-phenyloxdiazolyl-1',2',4')]-aniline⟶N,N-dimethylaniline. End product:

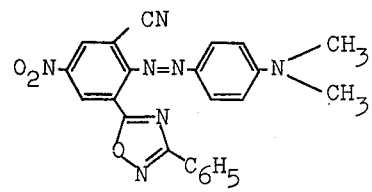

Reaction time: 3 hours. Temperature: 120°C. Shade on polyethylene glycol terephthalate: violet.

EXAMPLE 15

Starting product: 2-bromo-4-nitro-6-[5'-(3'-ethyloxdiazolyl-1',2',4')]-aniline⟶N-β-methoxyethyl-N-ethylaniline. End product:

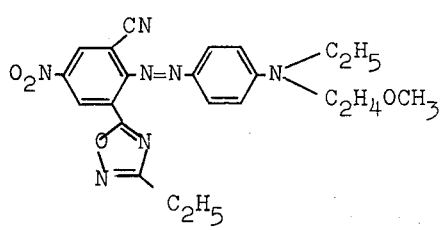

Reaction time: 3 hours. Temperature: 120°C. Shade on polyethylene glycol terephthalate: red violet.

EXAMPLE 16

Starting product: 2-bromo-4-nitro-6-[5'-(3'-diazolyl-1',2',4')]-aniline⟶N,N-β-bishydroxyethyl-m-toluidine. End product:

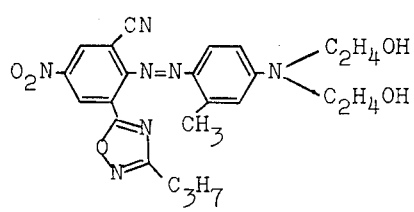

Reaction time: 3 hours. Temperature: 130°C. Shade on polyethylene glycol terephthalate: violet.

EXAMPLE 17

Starting product: 2-bromo-4-nitro-6-[5'-(3'-m-methoxyphenyloxidiazolyl-1',2',4')]-aniline ⟶ N-γ-acetylaminopropyl-N-ethyl-m-toluidine. End product:

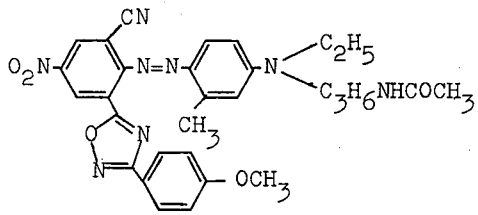

Reaction time: 3 hours. Temperature: 130°C. Shade on polyethylene glycol terephthalate: violet.

EXAMPLE 18

Starting product: 2-bromo-4-nitro-6-[5'-(3'-isopropyloxdiazolyl-1',2',4')]-aniline ⟶ N-β-cyanoethyl-N-ethyl-m-toluidine. End product:

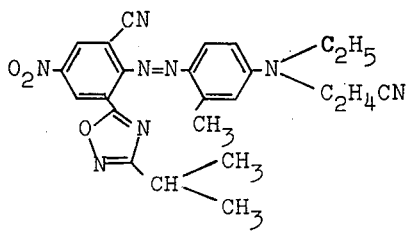

Reaction time: 3 hours. Temperature: 120°C. Shade on polyethylene glycol terephthalate: claret.

EXAMPLE 19

25.9 parts of the dye 2-bromo-4-nitro-6-[2'-(thiazolyl-1',3')]-aniline ⟶ 3-diethylaminoacetanilide is stirred in 500 parts of water and 5.1 parts of cuprous cyanide in an autoclave for 3 hours at 100°C. The reaction mixture is cooled to room temperature and a mixture of 40 parts of concentrated ammonia and 50 parts of water is added. The whole is stirred for 1 hour and suction filtered, and the filter cake is washed with water until the filtrate is colorless and dried at 50°C at subatmospheric pressure.

The dye thus obtained, which is a blackish powder, dissolves in dimethylformamide with a blue colour and dyes polyester cloth fast neutral blue shades.

The dyes set out in the following Examples are synthesized in an analogous manner:

EXAMPLE 20

Starting product: 2-bromo-4-nitro-6-[5'-(2',4'-methylthiazolyl-1',3')]-aniline ⟶ 3-diethylaminoacetanilide. End product:

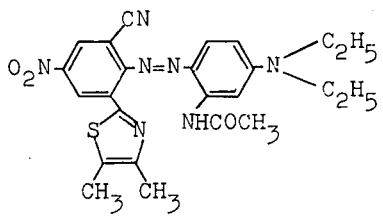

Reaction time: 3 hours. Temperature: 110°C. Shade on polyethylene glycol terephthalate: blue.

EXAMPLE 21

Starting product: 2-bromo-4-nitro-6-[2',4'-methyl-5'-carbomethoxy-thiazolyl-1',3')]-aniline ⟶ 3-diethylaminoacetanilide. End product:

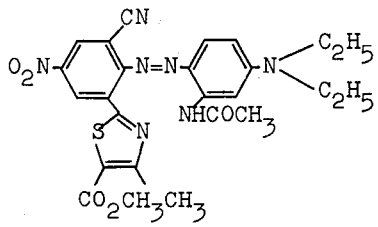

Reaction time: 3 hours. Temperature: 115°C. Shade on polyethylene glycol terephthalate: blue.

EXAMPLE 22

Starting product: 2-bromo-4-nitro-6-[2'-(benzothiazolyl-1',3')]-aniline ⟶ 3-diethylaminoacetanilide. End product:

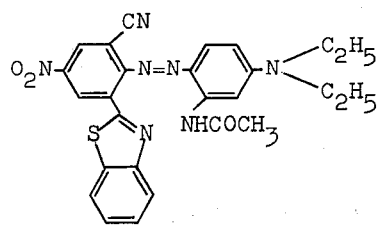

Reaction time: 3 hours. Temperature: 115°C. Shade on polyethylene glycol terephthalate: blue.

EXAMPLE 23

Starting material: 2-bromo-4-nitro-6-[2'-(5'-methylthiadiazolyl-1',3',4')]-aniline ⟶ 3-diethylaminoacetanilide. End product:

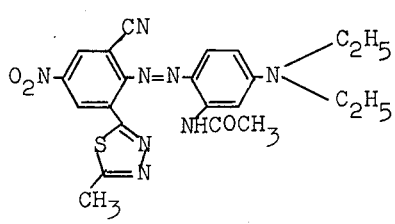

Reaction time: 3 hours. Temperature: 115°C. Shade on polyethylene glycol terephthalate: blue.

EXAMPLE 24

Starting product: 2-bromo-4-nitro-6-[2'-(5'-ethylthiadiazolyl-1',3',4')]-aniline ⟶ 3-diethylaminoacetanilide. End product:

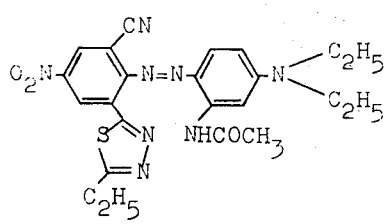

Reaction time: 4 hours. Temperature: 115°C. Shade of dyeing on polyethylene glycol terephthalate: blue.

EXAMPLE 25

Starting product: 2-bromo-4-nitro-6-[2'-(5'-isopropylthiadiazolyl-1',3',4')]-aniline ⟶ 3-diethylaminoacetanilide. End product:

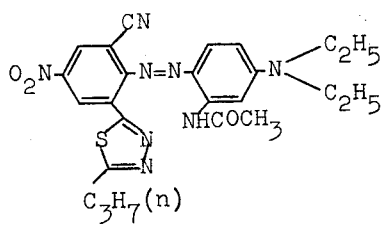

Reaction time: 3 hours. Temperature: 120°C. Shade on polyethylene glycol terephthalate: blue

EXAMPLE 26

Starting product: 2-bromo-4-nitro-6-[2'-(5'-phenylthiadiazolyl-1',3',4')]-aniline ⟶ 3-diethylaminoacetanilide. End product:

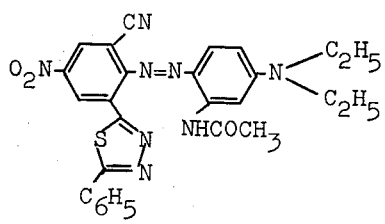

Reaction time: 3 hours. Temperature: 110°C. Shade on polyethylene glycol terephthalate: blue.

EXAMPLE 27

Starting product: 2-bromo-4-nitro-6-[2'-(5'-phenylthiadiazolyl-1',3',4')]-aniline ⟶ N-β-hydroxyethyl-N-β-cyanoethylamino-3-acetylamino-6-methoxybenzene. End product:

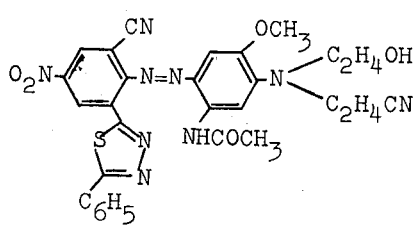

Reaction time: 2 hours. Temperature: 120°C. Shade on polyethylene glycol terephthalate: green.

EXAMPLE 28

Starting product: 2-bromo-4nitro-6-[5'-(2'-methylthiadiazolyl-1',3',4')]-aniline ⟶ N,N-β-bishydroxyethylamino-3-acetylaminobenzene. End product:

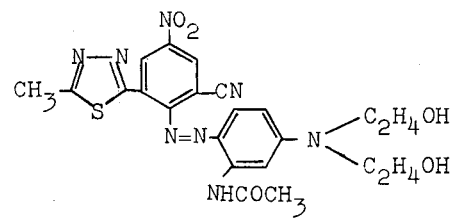

Reaction time: 3 hours. Temperature: 120°C. Shade on polyethylene glycol terephthalate: blue.

EXAMPLE 29

Starting product:2-bromo-4-nitro-6-[5'-(2'-butylthiadiazolyl-1',3',4')]-aniline ⟶ 2-methoxy-5-acetylamino-N,N-β-bis-hydroxyethylaniline. End product:

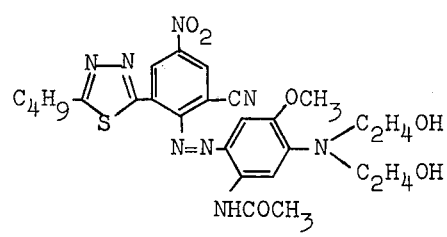

Reaction time: 4 hours. Temperature: 120°C. Shade on polyethylene glycol terephthalate: greenish blue.

EXAMPLE 30

Starting product: 2-bromo-4-nitro-6-[5'-(2'-p-chlorophenylthiadiazolyl-1',3',4')]-aniline ⟶ 3-diethylaminoacetanilide. End product:

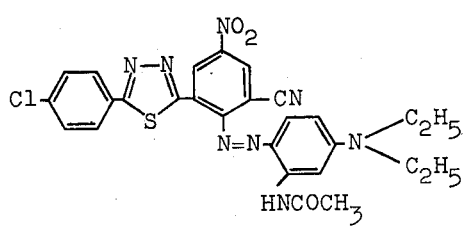

Reaction time: 3 hours. Temperature: 110°C. Shade on polyethylene glycol terephthalate: blue.

EXAMPLE 31

Starting product: 2-bromo-4-nitro-6-[5'-(2'-methylthiadiazolyl-1',3',4')]-aniline ⟶ 2-methoxy-5-acetylamino-N-β-cyanoethyl-N-β-hydroxyethylaniline. End product:

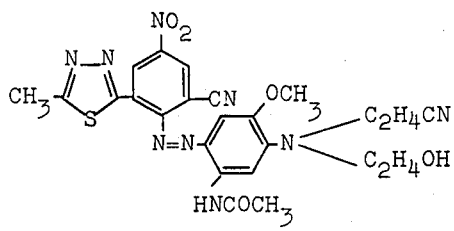

Reaction time: 3 hours. Temperature: 120°C. Shade on polyethylene glycol terephthalate: greenish blue.

EXAMPLE 32

Starting product: 2-bromo-4-nitro-6-[5'-(2'-ethylthiadiazolyl-1',3',4')]-aniline ———→2-methoxy-5-acetylamino-N-β-hydroxyethylaniline. End product:

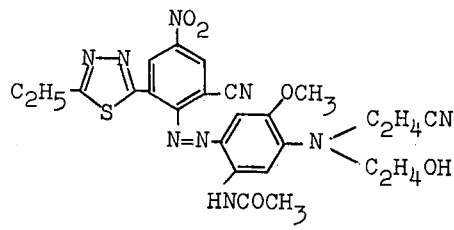

Reaction time: 3 hours. Temperature: 115°C. Shade on polyethylene glycol terephthalate: greenish blue.

EXAMPLE 33

Starting product: 2-bromo-4-nitro-6-[5'-(2'-phenylthiadiazolyl-1',3',4')]-aniline ———→3-acetylamino-N,N-β-bishydroxyethylaniline. End product:

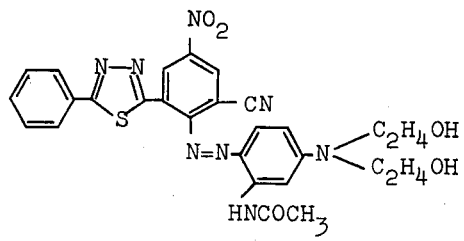

Reaction time: 3 hours. Temperature: 120°C. Shade on polyethylene glycol terephthalate: blue.

EXAMPLE 34

Starting product: 2-bromo-4-nitro-6-[5'-(2'butylthiadiazolyl-1',3',4')]-aniline ———→2-methoxy-5-acetylamino-N-β-cyanoethyl-N-β-hydroxyethylaniline. End product:

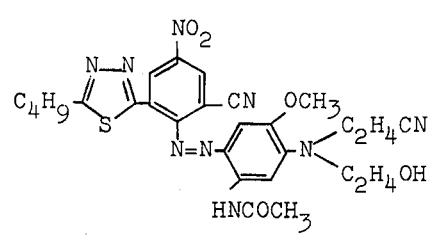

Reaction time: 3 hours. Temperature: 120°C. Shade on polyethylene glycol terephthalate: turquoise.

EXAMPLE 35

Starting product; 2-bromo-4-nitro-6-[5'-(2'-p-chlorophenyl-thiadiazolyl-1',3',4')]-aniline ———→3-acetylamino-N,N-β-hydroxyethylaniline. End product:

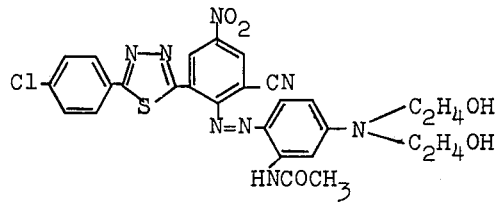

Reaction time: 4 hours. Temperature: 130°C. Shade on polyethylene glycol terephthalate: reddish blue.

EXAMPLE 36

Starting product: 2-bromo-4-nitro-6-[5'-(2'-methylthiadiazolyl-1',3',4')]-aniline ———→2-methoxy-5-acetylamino-N,N-β-bis-hydroxyethylaniline. End product:

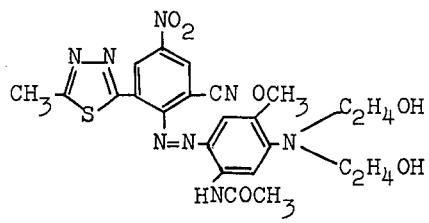

Reaction time: 4 hours. Temperature: 115°C. Shade on polyethylene glycol terephthalate: blue.

EXAMPLE 37

Starting product: 2-bromo-4-nitro-6-[5'-(2'-ethylthiadiazolyl-1',3',4')]-aniline ———→N,N-β-bishydroxyethylamino-m-acetanilide. End product:

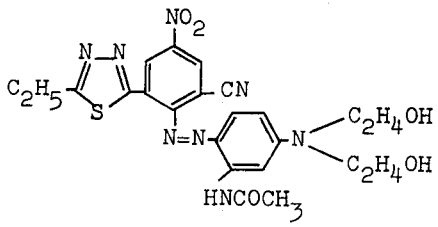

Reaction time: 3 hours. Temperature: 130°C. Shade on polyethylene glycol terephthalate: reddish blue.

EXAMPLE 38

Starting product: 2-bromo-4-nitro-6-[5'-(2'-butylthiadiazolyl-1',3',4')]-aniline ———→3-diethylaminoacetanilide. End product:

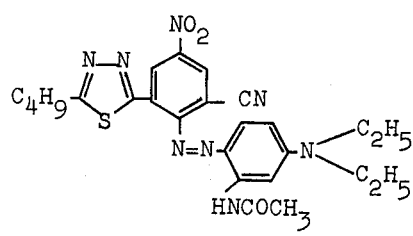

Reaction time: 3 hours. Temperature: 140°C. Shade on polyethylene glycol terephthalate: blue.

EXAMPLE 39

Starting product: 2-bromo-4-nitro-6-[5'-(2'-butylthiadiazolyl-1',3',4')]-aniline ⟶ N,N-β-bishydroxyethylamino-m-acetanilide. End product:

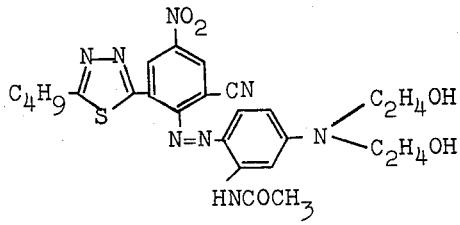

Reaction time: 3 hours. Temperature: 130°C. Shade on polyethylene glycol terephthalate: reddish blue.

EXAMPLE 40

Starting product: 2-bromo-4-nitro-6-[2'-(4'-bromophenyl-5'-bromothiazolyl-1',3')]-aniline ⟶ 3-diethylaminoacetanilide. End product:

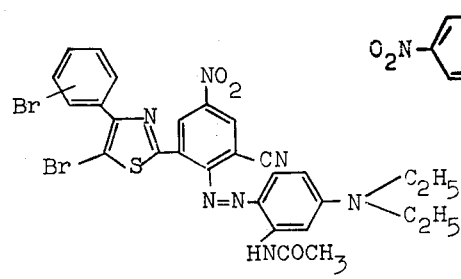

Reaction time: 3 hours. Temperature: 135°C. Shade on polyethylene glycol terephthalate: blue.

EXAMPLE 41

Starting product: 2-bromo-4-nitro-6-[2'-(4'-bromophenyl-5'-bromothiazolyl-1',3')]-aniline ⟶ N,-N-β-bishydroxyethylaminoacetanilide. End product:

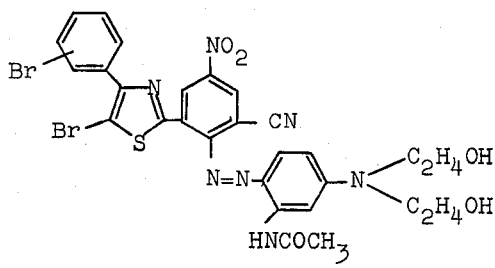

Reaction time: 3 hours. Temperature: 130°C. Shade on polyethylene glycol terephthalate: blue.

EXAMPLE 42

Starting product: 2-bromo-4-nitro-6-[2'-(4'-bromophenyl-5'-bromothiazolyl-1',3')]-aniline ⟶ 2-methoxy-5-acetylamino-N-β-cyanoethyl-N-β-hydroxyethylaniline. End product:

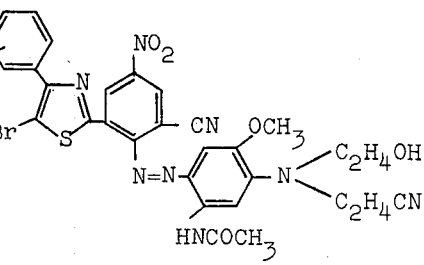

Reaction time: 3 hours. Temperature: 125°C. Shade on polyethylene glycol terephthalate: green.

We claim:
1. A process for the production of an azo dye of the formula

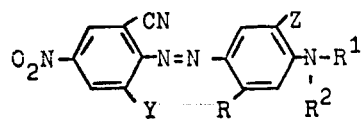
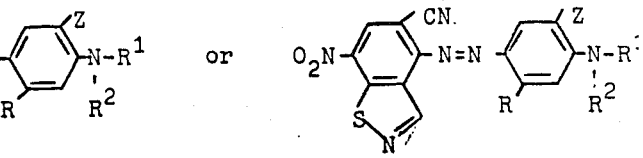

in which
Y is bromine, cyano, nitro,

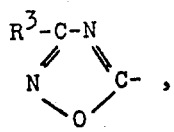 , 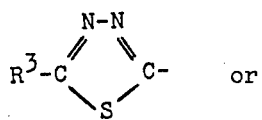 or 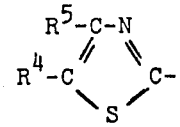

Z is hydrogen, methoxy, or ethoxy,
R is hydrogen, methyl, chlorine, methoxy, acetylamino or propionylamino,
$R^1$ is alkyl of one to four carbon atoms, hydroxyethyl, cyanoethyl, benzyl, phenylethyl or γ-acetylaminopropyl,
$R^2$ is alkyl of one to four carbon atoms or hydroxyethyl,
$R^3$ is hydrogen, alkyl of one to four carbon atoms, phenyl, methylphenyl, chlorophenyl, methoxyphenyl or dichlorophenyl,
$R^4$ is methyl,
$R^5$ is carbomethoxy or carboethoxy and
$R^4$ and $R^5$ taken together with the unsaturated linking carbon atoms form phenyl or phenyl substituted by methyl, ethyl, methoxy or ethoxy,
said process comprising reacting the same azo dye bearing bromine instead of cyano in ortho-position to the azo group with at least the equivalent amount up to an excess of 50 percent of cuprous cyanide at a temperature of from 70°C. to 180°C. and in water.

2. A process as claimed in claim 1 wherein the reaction is carried out at a temperature of 110° to 150°C. under superatmospheric pressure.

* * * * *